United States Patent [19]

Benkmann

[11] 4,324,565

[45] Apr. 13, 1982

[54] REMOVAL OF LUBRICANT MISTS AND LUBRICANT VAPORS FROM A GASEOUS STREAM

[75] Inventor: Christian Benkmann, Graefelfing, Fed. Rep. of Germany

[73] Assignee: Linde Aktiengesellschaft, Wiesbaden, Fed. Rep. of Germany

[21] Appl. No.: 180,286

[22] Filed: Aug. 22, 1980

[30] Foreign Application Priority Data

Aug. 30, 1979 [DE] Fed. Rep. of Germany ....... 2935147

[51] Int. Cl.³ ...................... B01D 49/00; B01D 53/04
[52] U.S. Cl. .......................................... 55/23; 55/27; 55/68; 55/74; 55/80
[58] Field of Search ................... 55/23, 27, 68, 74, 80, 55/267, 268, 316, 387

[56] References Cited

U.S. PATENT DOCUMENTS

| | | | |
|---|---|---|---|
| 1,831,644 | 11/1931 | Adair et al. | 55/316 X |
| 3,076,301 | 2/1963 | Roof | 55/316 X |
| 3,395,511 | 8/1968 | Akerman | 55/316 X |
| 3,834,130 | 9/1974 | Bissada et al. | 55/316 |
| 3,989,478 | 11/1976 | Jones | 55/80 X |

*Primary Examiner*—Robert H. Spitzer
*Attorney, Agent, or Firm*—Millen & White

[57] ABSTRACT

In a process for the removal of lubricant mists and lubricant vapors from a compressed gas comprising passing the compressed gas through an oil filter and an adsorber, the improvement which comprises, after passing the gas through the oil filter, heating the gas to such an extent that any oil mist remaining therein is completely vaporized before the gas is conducted through the adsorber.

17 Claims, 1 Drawing Figure

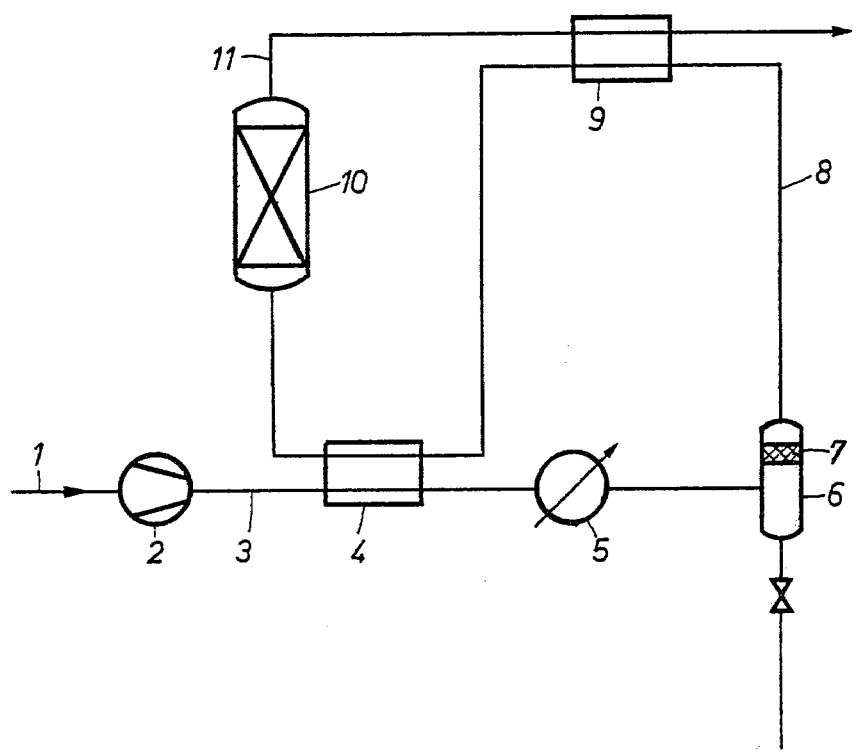

REMOVAL OF LUBRICANT MISTS AND LUBRICANT VAPORS FROM A GASEOUS STREAM

BACKGROUND OF THE INVENTION

This invention relates to a process for the removal of lubricant mists and lubricant vapors from a compressed gas with the use of an oil filter and an adsorber.

In the compression of gases or gaseous mixtures, it is frequently necessary to obtain a high pressure gaseous stream free of lubricating oil. Otherwise, oil vapors or oil mists contained in the gas often prove to be troublesome, for example, by precipitating out as solids during a subsequent processing of the gas in a low-temperature installation, or also simply by being insufficiently pure compressed gas for a use where certain purities are required.

Therefore, it was necessary heretofore in many cases to resort to oil-free compressors during the compression step, since with the use of an oil-lubricated compressor the necessary purity of the gas cannot be provided even if the oil is separated by means of a filter system and oil vapors are removed by adsorbers. For with an oil separation by means of filter systems, a residual content of mist droplets still remains in the gas in all cases. This residual content which can amount, for example, to 1% of the originally present oil mist is hardly reduced even if an adsorber is connected into the system, since the adsorber is ineffective for the removal of such mist droplets. The use of oil-free compressors, on the other hand, is disadvantageous because they are more expensive and have a higher attrition rate than oil-lubricated compressors.

SUMMARY OF THE INVENTION

An object of this invention is to provide an economical process for the complete separation of lubricant mists and lubricant vapors from a compressed gas without the use of oil-free compressors.

Upon further study of the specification and appended claims, further objects and advantages of this invention will become apparent to those skilled in the art.

These objects are attained by a process wherein the gas is heated after passing through the oil filter to such an extent that any oil mist still contained therein is entirely vaporized before conducting the gas through the adsorber.

Thereby, this invention, requires, as compared to the conventional process with oil filter and adsorber, merely a heater between the oil filter and the adsorber. Since the amount of heat required for the vaporization of the oil mist not retained in the oil filter, is surprisingly low, this method can be conducted without a substantially increased energy requirement.

In a particularly advantageous embodiment of the invention, the gas exiting from the oil separator is heated by heat exchange with the gas exiting from the oil-lubricated compressor. The heat of compression, which is conventionally dissipated without recovery by cooling against cooling water or air, is transferred to the gaseous stream to be heated so that the energy needed for heating the gas is thus extensively provided thereby. It has been found that the temperature level, for example, 100° to 120° C., attained during compression, for the compressed heat transfer gas is sufficient in most cases to ensure a complete vaporization of the oil mist remaining after the gas has passed through the oil separator. The compressed heat transfer gas after being cooled becomes process gas and leaves the oil separator at about 10° to 50°, preferably 20° to 40° C. Thereafter, the process gas containing the oil mist is generally heated to about 80° to 200° C., preferably about 100° to 120° C. to achieve complete vaporization of the mist.

An advantageous further development of the process of this invention provides that the gas exiting from the oil filter is first preheated against gas exiting from the adsorber. This mode of operation not only reduces any demand for additional externally supplied energy required for the heating step, but moreover the gas leaving the adsorber is also cooled thereby, which cooling is required in most cases.

The invention has particular application to the removal of oil mist from compressed gases, for example, from such gases as air, hydrogen, carbon monoxide, synthesis gases etc.

It is to be appreciated that this invention cannot only be applied to compressed gases containing a lubricating oil mist, but it can also be applied to the purification of any gas containing residual mist of any type where the mist converted to the gas phase can be removed by absorption.

BRIEF DESCRIPTION OF THE DRAWING

The attached FIGURE is a schematic flowsheet illustration of the preferred embodiment of the invention.

DETAILED DESCRIPTION OF THE DRAWING

A gas to be compressed is fed via conduit 1 to a compressor 2, from which it is withdrawn as an oil-containing gas via conduit 3. After cooling in a heat exchanger 4 against gas to be heated, this oil-containing gas is further cooled in an additional heat exchanger 5 against cooling water to attain as high a separation as possible of the oil mist in the down stream oil separator 6. This oil separator 6, equipped with mist filters 7, is of conventional construction and retains, for example, 99% of the oil mist contained in the gas. The remainder of the mist passes together with the gas, which likewise contains the oil vapors at this point in time, via conduit 8 to the heat exchanger 9 wherein a first heating of the gas is conducted. Subsequently, the gas is heated in heat exchanger 4 against gas exiting from the compressor 2 to such an extent that the residual oil mist is completely vaporized.

The gas, which contains oil vapor but is now free of oil mist, is conducted into the adsorber 10 filled with an adsorbent, for example silica gel or activated alumina. During this step, the oil vapors are completely adsorbed from the heated gas on these adsorbents, so that an oil-free gas (e.g., less than 0.01 mg per $Nm^3$ of gas) is withdrawn via conduit 11 from the adsorber 10. To utilize the heat of this purified gas, it is passed through the heat exchanger 9 where it heats the gas coming from the separator 6.

The adsorbent employed in the adsorber 10 can either be discarded after it is completely loaded, or it can be regenerated, for example, by roasting.

It is to be further understood that the oil separator need not necessarily be of the filter type, but can also be any conventional means for entrapping mist particles in the liquid phase.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the removal of oil mists and vapors from an oil-contaminated compressed gas comprising passing the compressed gas through an oil separator wherein liquid phase oil is removed from the gas and passing the resultant gas through an adsorber to remove gaseous phase oil, the improvement which comprises, after passing the compressed gas through the oil separator, heating the withdrawn compressed gas to such an extent that any oil mist remaining therein is completely vaporized before the withdrawn compressed gas is conducted through the adsorber.

2. A process according to claim 1, wherein hot compressed oil-contaminated gas is passed in indirect heat exchange relationship with the compressed gas withdrawn from the oil separator to conduct at least partial heating of the withdrawn gas from the oil separator.

3. A process according to claim 2, wherein the compressed gas, after being withdrawn from the oil separator, is first heated by indirect heat exchange with compressed purified gas exiting from the adsorber.

4. A process according to claim 3, wherein the oil-contaminated compressed gas is cooled prior to entering said oil separator.

5. A process according to claim 2, wherein the oil-contaminated compressed gas is cooled prior to entering said oil separator.

6. A process according to claim 5, wherein compressed gas leaving the oil separator is at about 10°–50° C.

7. A process according to claim 6, wherein the compressed gas is heated to about 80°–200° C. to achieve complete vaporization of the mist.

8. A process according to claim 5, wherein compressed gas leaving the oil separator is at about 20°–40° C.

9. A process according to claim 8, wherein the compressed gas is heated to about 80°–200° C. to achieve complete vaporization of the mist.

10. A process according to claim 1, wherein the compressed gas, after being withdrawn from the oil separator, is first heated by indirect heat exchange with compressed purified gas exiting from the adsorber.

11. A process according to claim 10, wherein the oil-contaminated compressed gas is cooled prior to entering said oil separator.

12. A process according to claim 1, wherein the oil-contaminated compressed gas is cooled prior to entering said oil separator.

13. A process according to claim 12, wherein compressed gas leaving the oil separator is at about 10°–50° C.

14. A process according to claim 13 wherein the compressed gas is heated to about 80°–200° C. to achieve complete vaporization of the mist.

15. A process according to claim 12, wherein compressed gas leaving the oil separator is at about 20°–40° C.

16. A process according to claim 15, wherein the compressed gas is heated to about 80°–200° C. to achieve complete vaporization of the mist.

17. A process according to claim 1, wherein a gas is recovered from the adsorber containing less than 0.01 mg of oil per $Nm^3$ of gas.

* * * * *